United States Patent [19]

Kato et al.

[11] Patent Number: 4,789,709

[45] Date of Patent: Dec. 6, 1988

[54] PROCESS FOR THE PRODUCTION OF HEAT RESISTANT THERMOPLASTIC COPOLYMER

[75] Inventors: Yasuyuki Kato; Masahiro Yuyama; Masahiko Moritani; Hideaki Matsuura; Susumu Iijima; Tsuyoshi Hashimoto, all of Niihama, Japan

[73] Assignee: Sumitomo Chemical Company, Limited, Osaka, Japan

[21] Appl. No.: 924,752

[22] Filed: Oct. 30, 1986

[30] Foreign Application Priority Data

May 2, 1985 [JP] Japan .................... 60-095104
May 15, 1985 [JP] Japan .................... 60-103342

[51] Int. Cl.$^4$ .................................... C08F 8/48
[52] U.S. Cl. ........................ 525/366; 525/330.2; 525/369
[58] Field of Search ........................ 525/366, 369

[56] References Cited

U.S. PATENT DOCUMENTS

| | | | |
|---|---|---|---|
| 4,246,374 | 1/1981 | Kopchik | 525/378 |
| 4,248,990 | 2/1981 | Pieski et al. | 525/366 |
| 4,252,924 | 2/1981 | Chatterjee | 525/366 |

FOREIGN PATENT DOCUMENTS

| | | |
|---|---|---|
| 58-217501 | 6/1982 | Japan . |
| 6020905 | 7/1983 | Japan . |
| 6058408 | 9/1983 | Japan . |
| 6060110 | 9/1983 | Japan . |
| 1437176 | 5/1976 | United Kingdom . |

*Primary Examiner*—Joseph L. Schofer
*Assistant Examiner*—Bernard Lipman
*Attorney, Agent, or Firm*—Birch, Stewart, Kolasch & Birch

[57] ABSTRACT

A process for the production of a thermoplastic copolymer having excellent heat distortion resistance is disclosed. The process includes heat-treating a raw copolymer comprising a vinyl monomer unit including methacrylic and/or acrylic acid units in the presence of a specific ring-closing promoter selected from basic compounds, whereby the methacrylic and/or acrylic acid unit is converted into six-membered cyclic anhydride unit. The copolymer has excellent heat distortion resistance, transparency, mechanical properties and processability, and can produce a formed product without splash on the surface. The copolymer is useful for the production of various parts, such as automobile parts, electrical parts, industrial parts, and miscellaneous goods.

9 Claims, No Drawings

PROCESS FOR THE PRODUCTION OF HEAT RESISTANT THERMOPLASTIC COPOLYMER

This invention relates to a process for the production of a heat resistant thermoplastic copolymer. More particularly, the invention relates to a process for the production of a thermoplastic copolymer having excellent heat distortion resistance which is characterized by converting carboxyl groups in the molecule of the polymer into anhydride groups by heating-treating the raw copolymer containing carboxyl groups in the presence of a ring-closing promoter.

BACKGROUND OF THE INVENTION

Thermoplastic copolymers, particularly polymethyl methacrylate, polystyrene, and methyl methacrylate-styrene copolymers, have desirable characteristics such as excellent transparency, mechanical properties and processability and hence have widely been used in various fields such as automobile parts, electrical parts, industrial parts, miscellaneous goods, and the like.

However, with the expansion of the utilities of these materials, it is required to obtain resin materials having more improved heat distortion resistance and more improved transparency and mechanical properties. Extensive investigation has been conducted for obtaining materials having such required properties. For instance, it is known that a polymer having excellent heat distortion resistance can be produced by copolymerizing methacrylic acid and methyl methacrylate and/or styrene. Generally speaking, however, a methacrylic copolymer resin has high water absorption properties and hence shows low heat resistance due to the water absorption, and further, when the resin is processed to obtain formed products, the products have unsatisfactory splash (stripe, etc.) on the back surface thereof due to generation of volatile materials induced by dehydration during the forming and processing steps.

In order to eliminate such a drawback, it is proposed in U.K. Pat. No. 1,437,176 that a certain amount of an ethylenically unsaturated carboxylic acid group copolymerized in the polymer is converted into a carboxylic anhydride group, and thereby, there can be produced a heat resistant thermoplastic copolymer which can give a formed product having no splash on the back. It is also known that such a polymer is advantageous in high resistance to crazing induced by solvents and further resistance to water. However, in order to convert sufficiently the carboxyl group into anhydride group, it is required to pass the copolymer through an extruder repeatedly, and hence, this process has less productivity and is hardly practiced on an industrial scale.

Japanese Patent first publication (Kokai) No. 217501/1983 discloses a novel copolymer comprising mainly methacrylic acid units which has excellent heat resistance and heat stability. According to the working examples in this literature, the copolymer is produced by copolymerizing methyl methacrylate and/or styrene and methacrylic acid by a continuous bulk polymerization and transferring the resulting copolymer and unreacted materials to a vacuum chamber at a high temperature, wherein the unreacted materials are removed and a six-membered cyclic anhydride group is formed. However, it is necessary to retain the copolymer resin within the high temperature vacuum chamber for a long period of time in order to form the six-membered cyclic anhydride group, which results unfavorably in coloring of the polymer.

Japanese Patent first publication (Kokai) No. 87449/1977 discloses a process for the production of a methacrylic resin composition having excellent fluidity and heat resistance by using an unsaturated carboxylic acid. However, according to this process, a smaller amount of unsaturated carboxylic acid is copolymerized, and hence, the improvement of the heat resistance is insufficient.

Thus, the known copolymers have various problems such as high water absorption properties, bad appearance of the formed product, low productivity, coloring of the product, less improvement in heat resistance, and the like.

SUMMARY OF THE INVENTION

According to the extensive study of the present inventors, it has been found that the methacrylic and/or acrylic acid group copolymerized in the polymer can be converted into the anhydride group by using a specific ring-closing promoter and thereby there can be produced the desired copolymer having excellent heat distortion resistance.

An object of the present invention is to provide an improved process for the production of a thermoplastic copolymer having excellent heat distortion resistance.

Another object of the invention is to provide an improved process for promoting the conversion of the copolymerized acrylic or methacrylic acid group into the anhydride group.

These and other objects and advantages of the invention will be apparent to skilled persons from the following description.

DETAILED DESCRIPTION OF THE INVENTION

The copolymer having excellent heat distortion resistance of this invention can be produced by heat-treating a copolymer comprising a vinyl monomer unit including a methacrylic and/or acrylic acid unit (hereinafter referred to as "raw copolymer") in the presence of 0.001 to 1% by weight of a ring-closing promoter selected from basic compounds, whereby the methacrylic and/or acrylic acid unit is converted into a six-membered cyclic anhydride unit.

The raw copolymer used in this invention includes copolymers of methacrylic and/or acrylic acid and a copolymerizable vinyl monomer. The content of the methacrylic and/or acrylic acid unit in the copolymer is in the range of 5 to 50% by weight, preferably 5 to 40% by weight. When the content is less than 5% by weight, the heat resistance is improved to a smaller degree, and the improvement (lowering) of water absorption properties of the copolymer is not sufficient. On the other hand, when the content is more than 50% by weight, the carboxylic acid unit remains without ring-closing, and hence, the product shows unfavorably low heat resistance due to water absorption and further production of splash on the back of the formed product due to volatile material.

The vinyl monomer copolymerizable with methacrylic and acrylic acid includes all conventional monomers which are usually used for the production of thermoplastic resins, for example, olefins, vinyl chloride, acrylonitrile, aromatic vinyl compounds, unsaturated carboxylic acid alkyl esters, and the like. Among these, unsaturated carboxylic acid alkyl esters and aromatic vinyl compounds are preferable. These vinyl monomers are used alone or in a combination of two or more thereof.

The unsaturated carboxylic acid alkyl esters include methacrylic acid esters and acrylic acid esters, for example, methyl methacrylate, n-butyl methacrylate, t-butyl methacrylate, n-bornyl methacrylate, isobornyl methacrylate, fenchyl methacrylate, cyclohexyl methacrylate, phenyl methacrylate, benzyl methacrylate, dicyclopentanyl methacrylate, methyl acrylate, butyl acrylate, and the like.

The aromatic vinyl compounds includes styrene, α-methylstyrene, and the like.

The raw copolymer used in this invention can be produced by copolymerizing the above-mentioned monomers by conventional polymerization methods, such as suspension polymerization, bulk polymerization, emulsion polymerization, solution polymerization, and the like, but preferably by suspension polymerization or bulk polymerization.

The basic compounds used as ring-closing promoters in this invention include inorganic or organic compounds. The inorganic basic compound includes alkali metal hydroxides or carbonates and alkaline earth metal hydroxides, for example, lithium hydroxide, sodium hydroxide, potassium hydroxide, lithium carbonate, sodium carbonate, potassium carbonate, calcium hydroxide, magnesium hydroxide, among which sodium hydroxide and potassium hydroxide are preferable.

The organic basic compound includes organic carboxylic acid metal salts, preferably alkali metal salts (e.g. lithium acetate, sodium acetate, potassium acetate, calcium acetate, magnesium acetate, lithium stearate, sodium stearate, potassium stearate, etc.), and alkali metal alkoxides (e.g. sodium methoxide, potassium methoxide, sodium ethoxide, potassium ethoxide, etc.)

Other basic compounds such as ammonium salts, amines and imines may also be used, but these compounds occasionally induce coloring of the product, and thus, are restricted in use depending on the utilities of the copolymer.

The ring-closing promoters may be used in any form of solid, aqueous solution or a solution in an organic solvent. The promoter may previously be added to the reaction system in the step of polymerization of monomers at one time or dividedly, or may be mixed to the raw copolymer with a mixer before or during the heat treatment thereof. The amount is in the range of 0.001 to 1% by weight, preferably 0.01 to 0.5% by weight, based on the weight of the raw copolymer. When the amount of the promoter is less than 0.001% by weight, the ring-closing of the methacrylic and/or acrylic acid unit is less effective, and on the other hand, when the amount is over 1% by weight, the ring-closing is no longer significantly promoted, but rather unfavorably causes production of a crosslinked product.

The heat treatment of the raw copolymer in this invention can be carried out by any conventional method. It is preferably carried out by supplying the raw material together with the ring-closing promoter to an apparatus having an ability to remove volatile materials by reducing the pressure, such as a heating furnace or extruder equipped with a vacuum pump or other vacuumizing device, particularly a deaeration extruder which is operated at a temperature higher than the softening point of the raw copolymer.

The heat treatment is usually carried out at a temperature of 150° to 350° C., preferably 220° to 320° C. When the temperature is lower than the lower limit, the ring-closing of the carboxylic acid unit into an anhydride unit is made insufficiently, and on the other hand, when the temperature is higher than the upper limit, the product is colored significantly, and the product is disadvantageously inferior in transparency. By the heat treatment, 70% by weight or more, preferably 80% by weight or more, of the methacrylic and/or acrylic acid unit in the copolymer is converted into the six-membered cyclic anhydride unit. The resulting copolymer thus heat-treated has a structure containing 3 to 50% by weight, preferably 5 to 30% by weight, of a six-membered cyclic anhydride unit.

When the ring-closing promoter is used for the raw material produced from methacrylic ester and acrylic ester monomer, the content of the six-membered cyclic anhydride unit in the copolymer may occasionally be over 100% by weight based on the methacrylic and/or acrylic acid unit in the raw copolymer.

According to this invention, the ring-closing ratio of the carboxylic acid unit into the six-membered cyclic anhydride unit is very high, and hence, even in the case of a raw copolymer having a high content of methacrylic and/or acrylic acid unit, the non-ring-closed methacrylic and/or acrylic acid unit is remains less in the copolymer, usually less than 10% by weight, preferably less than 5% by weight. Thus, the copolymer product obtained by this invention has significantly improved resistance to crazing and water resistance without any occurrence of splash on the back of the formed product which is usually observed in the conventional formed products obtained from a copolymer having less conversion into anydride units.

The present invention is illustrated by the following Examples but should not be construed to be limited thereto.

In the examples, the analysis or measurement of various properties of the product is carried out as follows.

(1) Measurement of the six-membered cyclic anhydride unit:

In the same manner as described in U.K. Pat. No. 1,437,176, it is measured by measuring absorbance at 1805 cm$^{-1}$ which is peculiar to the acid anhydride structure, by using an infrared spectrophotometer.

(2) Ring-closing ratio:

The ring-closing ratio is calculated by the following equation.

$$\text{Ring-closing ratio} = \frac{\text{Amount of the produced anhydride unit* (g)}}{\text{Amount of methacrylic and/or acrylic acid as used (g)}} \times 100$$

*The produced anhydride unit has the following formula:

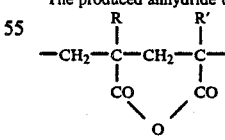

wherein R and R' are each H or CH$_3$, and the ratio of H and CH$_3$ is assumed to be the same as the ratio of methacrylic acid and acrylic acid as used.

(3) Melt flow index (MI):

It is measured by the method as described in ASTM D-1238 under the conditions of 230° C. and a load of 3.8 kg.

(4) Heat distortion temperature (HDT):

It is measured by the method as described in ASTM D-648 under the conditions of 18.6 kg.f/cm$^2$.

(5) Appearance of formed product:

A test sample (15 cm×15 cm×3 mm) is prepared by forming the copolymer by injection molding, and the production of splash is observed with the naked eye.

EXAMPLE 1

A 5 liter autoclave provided with a stirrer is charged with water (2.2 liter) and hydroxyethyl cellulose (2.4 g), and thereto are added methacrylic acid (160 g), methyl methacrylate (1440 g), laurylmercaptane (6.4 g) and lauroyl peroxide (5.6 g), and the mixture is polymerized by heating at 80° C. with agitation for one hour and 40 minutes. After raising the temperature to 98° C., the mixture is further agitated for one hour, by which the polymerization reaction is completed. The polymerization mixture is cooled, and the polymer is separated by centrifugation, washed with water and dried at 80° C. The polymer beads thus obtained have a content of methyl methacrylate of 90% by weight and methacrylic acid of 10% by weight. The dried beads (100 parts by weight) are mixed with sodium hydroxide (0.03 part by weight) with a Henschel mixer and then pelletized with a 40 mm deaeration extruder (VS 40-28 type, L/D=28, manufactured by Tanabe Plastic Kikai K.K.) at a screw rotation speed of 50 rpm at a resin temperature of 280° C.

As to the pellets, there were measured the ring-closing ratio and melt flow index (MI). Besides, the pellets were formed by injection molding at 260° C., and the surface of the formed product was observed, and further, the heat distortion temperature (HDT) was measured. The results are shown in Table 1.

EXAMPLES 2 TO 4

In the same manner as described in Example 1 except that the used amounts of the materials are varied as shown in Table 1, there are produced various products.

The properties of the products were measured likewise. The results are also shown in Table 1.

REFERENCE EXAMPLE 1

In the same manner as described in Example 1 except that no sodium hydroxide is added, there is produced a copolymer product.

The properties of the product were measured likewise. The results are also shown in Table 1.

EXAMPLE 5

A 5 liter autoclave provided with a stirrer is charged with water (2.2 liter) and hydroxyethyl cellulose (2.4 g), and thereto are added methacrylic acid (160 g), styrene (1440 g), tert-dodecylmercaptane (1.6 g) and benzoyl peroxide (28.8 g), and the mixture is stirred at 90° C. for 2.5 hours. After raising the temperture to 100° C., the mixture is further agitated for 30 minutes, by which the polymerization reaction is completed. The polymerization mixture is cooled, and the polymer is separated by centrifugation, washed with water and dried at 70° C. The polymer beads thus obtained have a content of styrene of 90.5% by weight and methacrylic acid of 9.5% by weight. The beads (100 parts by weight) are mixed with sodium hydroxide (0.03 part by weight) with a Henschel mixer and then pelletized with a 40 mm deaeration extruder in the same manner as described in Example 1.

As to the pellets, the properties were measured in the same manner as described in Example 1 except that the pellets were formed by injection molding at 230° C. The results are shown in Table 2.

EXAMPLE 6

A 5 liter autoclave provided with a stirrer is charged with water (2.2 liter) and hydroxyethyl cellulose (2.4 g), and thereto are added methacrylic acid (160 g), acrylic acid (80 g), methyl methacrylate (1360 g), laurylmercaptane (6.4 g) and lauroyl peroxide (5.6 g), and the mixture is polymerized by heating at 80° C. with agitation for one hour and 40 minutes. After raising the temperture to 98° C., the mixture is further agitated for one hour, by which the polymerization reaction is completed. The polymerization mixture is cooled, and the polymer is separated by centrifugation, washed with water and dried at 80° C. The polymer beads thus obtained have a content of methacrylic acid of 10% by weight, acrylic acid of 3% by weight and methyl methacrylate of 87% by weight. The beads (100 parts by weight) are mixed with sodium hydroxide (0.03 part by weight) with a Henschel mixer and then pelletized in the same manner as described in Example 1.

As to the pellets, various properties were measured in the same manner as described in Example 1. The results are shown in Table 2.

EXAMPLES 7 TO 10

In the same manner as described in Example 1 except that the basic compounds as shown in Table 2 are dispersed, there are produced various products.

The properties of the products were measured likewise. The results are also shown in Table 2.

TABLE 1

| Ex. No. | Amount of materials*1 as used (g) MMA | MAA | st | Composition*1 of dried beads (wt. %) MMA unit | MAA unit | st unit | Amount of NaOH (part by weight) | Resin temp. in heat-treating (°C.) | Ring-closing ratio (wt. %) | MI (g/10 min) | HDT (°C.) | Water absorp. (%) | Appearance of formed product*2 |
|---|---|---|---|---|---|---|---|---|---|---|---|---|---|
| Ex. 1 | 1440 | 160 | — | 90 | 10 | — | 0.03 | 280 | 120 | 1.3 | 120 | 1.6 | o |
| Ex. 2 | 1520 | 80 | — | 95 | 5 | — | 0.03 | 280 | 122 | 1.5 | 112 | 1.6 | o |
| Ex. 3 | 1120 | 480 | — | 70 | 30 | — | 0.03 | 280 | 95 | 0.5 | 135 | 1.9 | o |
| Ex. 4 | 1360 | 160 | 80 | 85 | 10 | 5 | 0.03 | 280 | 120 | 1.5 | 120 | 1.5 | o |
| Ref. Ex. 1 | 1440 | 160 | — | 90 | 10 | — | — | 280 | 56 | 1.3 | 120 | 2.1 | Δ |

*1MMA: Methyl methacrylate, MAA: Methacrylic acid, st: Styrene
*2o: Formed product having excellent appearance
Δ: Splash was slightly observed on the surface of the formed product.

REFERENCE EXAMPLE 2

In the same manner as described in Example 1 except that sodium hydroxide is added in an amount of 2 parts by weight per 100 parts by weight of the dried beads, there is produced a copolymer product.

The properties of the product were measured likewise. The results are also shown in Table 2.

mixture is polymerized by heating at 80° C. with agitation for one hour and 40 minutes. After raising the tem-

TABLE 2

| Ex. No. | Amount of materials*1 as used (g) | | | | Composition*1 of dried beads (wt. %) | | | | Kind of basic compd. (wt. part) | Resin temp. in heat-treating (°C.) | Ring-closing ratio (wt. %) | Properties | | | Appearance of formed product*2 |
|---|---|---|---|---|---|---|---|---|---|---|---|---|---|---|---|
| | MMA | MAA | AA | st | MMA unit | MAA unit | AA unit | st unit | | | | MI (g/10 min) | HDT (°C.) | Water absorp. (%) | |
| Ex. 5 | — | 160 | — | 1440 | — | 9.5 | — | 90.5 | NaOH (0.03) | 230 | 80 | 7.5 | 118 | 0.5 | o |
| Ex. 6 | 1360 | 160 | 80 | — | 87 | 10 | 3 | — | NaOH (0.03) | 280 | 105 | 1.3 | 122 | 1.7 | o |
| Ex. 7 | 1440 | 160 | — | — | 90 | 10 | — | — | NaOH (0.01) | 280 | 104 | 1.3 | 120 | 1.6 | o |
| Ex. 8 | 1440 | 160 | — | — | 90 | 10 | — | — | NaOH (0.5) | 280 | 127 | 1.2 | 119 | 1.6 | o |
| Ex. 9 | 1440 | 160 | — | — | 90 | 10 | — | — | KOH (0.03) | 280 | 123 | 1.3 | 120 | 1.6 | o |
| Ex. 10 | 1440 | 160 | — | — | 90 | 10 | — | — | Ca(OH)$_2$ (0.03) | 280 | 94 | 1.0 | 118 | 1.8 | o |
| Ref. Ex. 2 | 1440 | 160 | — | — | 90 | 10 | — | — | NaOH (2) | 280 | 132 | 0.2 | 120 | 1.6 | x |

*1MMA: Methyl methacrylate, MAA: Methacrylic acid, AA: Acrylic acid, st: Styrene
*2o: Formed product having excellent appearance
x: Formed product having surface roughness due to less fluidity due to the presence of gel materials

EXAMPLE 11

A 5 liter autoclave provided with a stirrer is charged with water (2.2 liter) and hydroxyethyl cellulose (2.4 g), and thereto are added methacrylic acid (160 g), styrene (1440 g), tert-dodecylmercaptane (1.6 g) and benzoyl peroxide (28.8 g), and the mixture is stirred at 90° C. for 2.5 hours. After raising the temperture to 100° C., the mixture is further agitated for 30 minutes, by which the polymerization reaction is completed. The polymerization mixture is cooled, and the polymer is separated by centrifugation, washed with water and dried at 70° C. The polymer beads thus obtained have a content of styrene of 90.5% by weight and methacylic acid of 9.5% by weight. The beads (100 parts by weight) are mixed with sodium methoxide (0.03 part by weight) with a Henschel mixer and then pelletized with a 40 mm deaeration extruder in the same manner as described in Example 1.

As to the pellets, the properties were measured in the same manner as described in Example 1 except that the pellets were formed by injection molding at 230° C. The results are shown in Table 3.

EXAMPLE 12

A 5 liter autoclave provided with a stirrer is charged with water (2.2 liter) and hydroxyethyl cellulose (2.4 g), and thereto are added methacrylic acid (160 g), acrylic acid (80 g), methyl methacrylate (1360 g), laurylmercaptane (6.4 g) and lauroyl peroxide (5.6 g), and the mixture is polymerized by heating at 80° C. with agitation for one hour and 40 minutes. After raising the temperture to 98° C., the mixture is further agitated for one hour, by which the polymerization reaction is completed. The polymerization mixture is cooled, and the polymer is separated by centrifugation, washed with water and dried at 80° C. The polymer beads thus obtained have a content of methacrylic acid of 10% by weight, acrylic acid of 3% by weight and methyl methacrylate of 87% by weight. The beads (100 parts by weight) are mixed with sodium methoxide (0.03 part by weight) with a Henschel mixer and then pelletized in the same manner as described in Example 1.

As to the pellets, various properties were measured in the same manner as described in Example 1. The results are shown in Table 3.

EXAMPLES 13 TO 19

In the same manner as described in Example 12 except that the basic compounds as shown in Table 3 are dispersed and the heat-treating temperature is varied, there are produced various products.

The properties of the products were measured likewise. The results are also shown in Table 3.

REFERENCE EXAMPLE 3

In the same manner as described in Example 1 except that sodium methoxide is added in an amount of 2 parts by weight per 100 parts by weight of the dried beads, there is produced a copolymer product.

The properties of the product were measured likewise. The results are also shown in Table 3.

TABLE 3

| Ex. No. | Amount of materials*1 as used (g) | | | | Composition*1 of dried beads (wt. %) | | | | Kind of basic compd.*2 (wt. part) | Resin temp. in heat-treating (°C.) | Ring-closing ratio (wt. %) | Properties | | | Appearance of formed product*3 |
|---|---|---|---|---|---|---|---|---|---|---|---|---|---|---|---|
| | MMA | MAA | AA | st | MMA unit | MAA unit | AA unit | st unit | | | | MI (g/10 min) | HDT (°C.) | Water absorp. (%) | |
| Ex. 11 | — | 160 | — | 1440 | — | 9.5 | — | 90.5 | NaOMe (0.03) | 230 | 80 | 7.5 | 118 | 0.5 | o |
| Ex. 12 | 1360 | 160 | 80 | — | 87 | 10 | 3 | — | NaOMe (0.03) | 280 | 105 | 1.3 | 122 | 1.7 | o |
| Ex. 13 | 1440 | 160 | — | — | 90 | 10 | — | — | NaOMe (0.01) | 280 | 104 | 1.3 | 120 | 1.6 | o |
| Ex. 14 | 1440 | 160 | — | — | 90 | 10 | — | — | NaOMe (0.5) | 280 | 127 | 1.2 | 119 | 1.6 | o |
| Ex. 15 | 1440 | 160 | — | — | 90 | 10 | — | — | Guanid. | 280 | 88 | 1.4 | 120 | 1.7 | o |

TABLE 3-continued

| Ex. No. | Amount of materials*1 as used (g) | | | | Composition*1 of dried beads (wt. %) | | | | Kind of basic compd.*2 (wt. part) | Resin temp. in heat-treating (°C.) | Ring-closing ratio (wt. %) | Properties | | | Appearance of formed product*3 |
|---|---|---|---|---|---|---|---|---|---|---|---|---|---|---|---|
| | MMA | MAA | AA | st | MMA unit | MAA unit | AA unit | st unit | | | | MI (g/10 min) | HDT (°C.) | Water absorp. (%) | |
| Ex. 16 | 1440 | 160 | — | — | 90 | 10 | — | — | (0.03) Imidaz. (0.1) | 280 | 97 | 1.3 | 120 | 1.7 | o |
| Ex. 17 | 1440 | 160 | — | — | 90 | 10 | — | — | DBU (0.1) | 280 | 120 | 1.9 | 120 | 1.6 | o |
| Ex. 18 | 1440 | 160 | — | — | 90 | 10 | — | — | Tri-EtN (0.04) | 280 | 80 | 1.3 | 120 | 1.8 | o |
| Ex. 19 | 1440 | 160 | — | — | 90 | 10 | — | — | NaOMe (0.5) | 300 | 80 | 1.3 | 120 | 1.9 | o |
| Ref. Ex. 3 | 1440 | 160 | — | — | 90 | 10 | — | — | NaOMe (2) | 280 | 132 | 0.2 | 120 | 1.6 | x |

*1MMA: Methyl methacrylate, MAA: Methacrylic acid, AA: Acrylic acid, st: Sryrene
*2NaOMe: Sodium methoxide, Guanid.: Guanidine, Imidaz.: 2-Phenyl-4-methylimidazole, DBU: 1,8-Diazabicyclo[5.4.0]undecene-7, Tri-EtN: Triethylamine
*3o: Formed product having excellent appearance
x: Formed product having surface roughness due to less fluidity because of the presence of gel materials

EXAMPLE 20

A 5 liter autoclave provided with a stirrer is charged with water (2.2 liter) and hydroxyethyl cellulose (2.4 g), and thereto are added methacrylic acid (160 g), methyl methacrylate (1440 g), laurylmercaptane (6.4 g) and lauroyl peroxide (5.6 g), and the mixture is polymerized by heating at 80° C. with agitation for one hour and 40 minutes. After raising the temperture to 98° C., the mixture is further agitated for one hour, by which the polymerization reaction is completed. The polymerization mixture is cooled, and the polymer is separated by centrifugation, washed with water and dried at 80° C. The polymer beads thus obtained have a content of methyl methacrylate of 90% by weight and methacylic acid of 10% by weight. The dried beads (100 parts by weight) are mixed with sodium methoxide (0.03 part by weight) with a Henschel mixer, and the mixture is spread on a stainless steel plate, and the plate is allowed to stand in an oven at 300° C. under reduced pressure for 30 minutes. After cooling, the resultant is crushed to give pellets.

As to the pellets, there were measured the ring-closing ratio and melt flow index (MI). Besides, the pellets were formed by injection molding at 260° C., and the surface of the formed product was observed, and further, the heat distortion temperature (HDT) was measured. The results are shown in Table 4.

EXAMPLE 21

A 5 liter autoclave provided with a stirrer is charged with water (2.2 liter) and hydroxyethyl cellulose (2.4 g), and thereto are added methacrylic acid (160 g), styrene (1440 g), tert-dodecylmercaptane (1.6 g) and benzoyl peroxide (28.8 g), and the mixture is stirred at 90° C. for 2.5 hours. After raising the temperture to 100° C., the mixture is further agitated for 30 minutes, by which the polymerization reaction is completed. The polymerization mixture is cooled, and the polymer is separated by centrifugation, washed with water and dried at 70° C. The polymer beads thus obtained have a content of styrene of 90.5% by weight and methacrylic acid of 9.5% by weight. The beads (100 parts by weight) are mixed with potassium acetate (0.3 part by weight) with a Henschel mixer and then pelletized with a 40 mm deaeration extruder in the same manner as described in Example 1.

As to the pellets, the properties were measured in the same manner as described in Example 1 except that the pellets were formed by injection molding at 230° C. The results are shown in Table 4.

EXAMPLE 22

A 5 liter autoclave provided with a stirrer is charged with water (2.2 liter) and hydroxyethyl cellulose (2.4 g), and thereto are added methacrylic acid (160 g), acrylic acid (80 g), methyl methacrylate (1360 g), laurylmercaptane (6.4 g) and lauroyl peroxide (5.6 g), and the mixture is polymerized by heating at 80° C. with agitation for one hour and 40 minutes. After raising the temperture to 98° C., the mixture is further agitated for one hour, by which the polymerization reaction is completed. The polymerization mixture is cooled, and the polymer is separated by centrifugation, washed with water and dried at 80° C. The polymer beads thus obtained have a content of methacrylic acid of 10% by weight, acrylic acid of 3% by weight and methyl methacrylate of 87% by weight. The beads (100 parts by weight) are mixed with potassium acetate (0.3 part by weight) with a Henschel mixer and then pelletized in the same manner as described in Example 1.

As to the pellets, various properties were measured in the same manner as described in Example 1. The results are shown in Table 4.

EXAMPLES 23 TO 27

In the same manner as described in Example 1 except that the basic compounds as shown in Table 4 are dispersed, there are produced various products.

The properties of the products were measured likewise. The results are also shown in Table 4.

REFERENCE EXAMPLE 4

In the same manner as described in Example 1 except that potassium acetate is added in an amount of 2 parts by weight per 100 parts by weight of the dried beads, there is produced a copolymer product.

The properties of the product were measured likewise. The results are also shown in Table 4.

EXAMPLE 28

In the same manner as described in Example 20 except that potassium acetate (0.3 part by weight) is used instead of sodium methoxide (0.03 part by weight), there is produced a copolymer product.

The properties of the product were measured likewise. The results are also shown in Table 4.

bonate, potassium carbonate, calcium hydroxide, and magnesium hydroxide.

TABLE 4

| Ex. No. | Amount of materials*1 as used (g) | | | | Composition*1 of dried beads (wt. %) | | | | Kind of basic compd.*2 (wt. part) | Resin temp. in heat-treating (°C.) | Ring-closing ratio (wt. %) | Properties | | | Appearance of formed product*3 |
|---|---|---|---|---|---|---|---|---|---|---|---|---|---|---|---|
| | MMA | MAA | AA | st | MMA unit | MAA unit | AA unit | st unit | | | | MI (g/10 min) | HDT (°C.) | Water absorp. (%) | |
| Ex. 20 | 1440 | 160 | — | — | 90 | 10 | — | — | NaOMe (0.03) | 300 | 80 | 1.3 | 120 | 1.8 | o |
| Ex. 21 | — | 160 | — | 1440 | — | 9.5 | — | 90.5 | KOAc (0.3) | 230 | 80 | 7.2 | 118 | 0.5 | o |
| Ex. 22 | 1360 | 160 | 80 | — | 87 | 10 | 3 | — | KOAc (0.3) | 280 | 105 | 1.3 | 122 | 1.7 | o |
| Ex. 23 | 1440 | 160 | — | — | 90 | 10 | — | — | KOAc (0.03) | 280 | 86 | 1.3 | 120 | 1.8 | o |
| Ex. 24 | 1440 | 160 | — | — | 90 | 10 | — | — | NaOAc (0.3) | 280 | 116 | 1.3 | 120 | 1.6 | o |
| Ex. 25 | 1440 | 160 | — | — | 90 | 10 | — | — | K$_2$CO$_3$ (0.1) | 280 | 119 | 1.3 | 120 | 1.6 | o |
| Ex. 26 | 1440 | 160 | — | — | 90 | 10 | — | — | Na$_2$CO$_3$ (0.1) | 280 | 114 | 1.3 | 120 | 1.6 | o |
| Ex. 27 | 1440 | 160 | — | — | 90 | 10 | — | — | NaOSte (0.2) | 280 | 116 | 1.4 | 120 | 1.6 | o |
| Ex. 28 | 1440 | 160 | — | — | 90 | 10 | — | — | KOAc (0.3) | 300 | 80 | 1.3 | 119 | 1.9 | o |
| Ref. Ex. 4 | 1440 | 160 | — | — | 90 | 10 | — | — | KOAc (2) | 280 | 120 | 0.2 | 120 | 1.6 | x |

*1MMA: Methyl methacrylate, MAA: Methacrylic acid, AA: Acrylic acid, st: Styrene
*2NaOMe: Sodium methylate, KOAc: Potassium acetate, NaOAc: Sodium acetate, NaOSte: Sodium stearate
*3o: Formed product having excellent appearance
x: Formed product having surface roughness due to less fluidity because of the presence of gel materials

What is claimed is:

1. A process for the production of a copolymer, which comprises heat-treating a raw copolymer comprising units of a vinyl monomer and 5 to 50% by weight of a methacrylic and/or acrylic acid unit in the presence of 0.01 to 0.5% by weight of a basic compound, thereby converting the methacrylic and/or acrylic acid unit into a six-membered cyclic anhydride unit, wherein the vinyl monomer is a member selected from the group consisting of methacrylic esters, acrylic esters and aromatic vinyl compounds, and the basic compound is a member selected from the group consisting of alkali metal hydroxides or carbonates, alkaline earth metal hydroxides, organic carboxylic acid alkali metal salts and alkali metal alkoxides.

2. The process according to claim 1, wherein the heat treatment is carried out at a temperature of 150° to 350° C.

3. The process according to claim 1, wherein the weight content of the methacrylic and/or acrylic acid unit is 5 to 40% by weight.

4. The process according to claim 1, wherein the basic compound is a member selected from the group consisting of lithium hydroxide, sodium hydroxide, potassium hydroxide, lithium carbonate, sodium carbonate, potassium carbonate, calcium hydroxide, and magnesium hydroxide.

5. The process according to claim 1, wherein the basic compound is a member selected from the group consisting of lithium acetate, sodium acetate, potassium acetate, calcium acetate, magnesium acetate, lithium stearate, sodium stearate, potassium stearate, sodium methoxide, potassium methoxide, sodium ethoxide, and potassium ethoxide.

6. The process according to claim 2, wherein the heat treatment is carried out at a temperature of 220° to 320° C.

7. The process according to claim 1, which occurs by suspension polymerization, bulk polymerization, emulsion polymerization, or solution polymerization.

8. The process according to claim 1, wherein the aromatic vinyl compounds are selected from the group consisting of styrene and α-methylstyrene.

9. The process according to claim 1, wherein the methacrylic and acrylic esters are selected from the group consisting of methyl methacrylate, n-butyl methacrylate, t-butyl methacrylate, n-bornyl methacrylate, isobornyl methacrylate, fenchyl methacrylate, cyclohexyl methacrylate, phenyl methacrylate, benzyl methacrylate, dicyclopentanyl methacrylate, methyl acrylate, and butyl acrylate.

* * * * *